United States Patent
Liang (10) Patent No.: US 7,203,707 B2
(45) Date of Patent: Apr. 10, 2007

(54) SYSTEM AND METHOD FOR KNOWLEDGE ASSET ACQUISITION AND MANAGEMENT

(75) Inventor: Shih-Tsung Liang, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 519 days.

(21) Appl. No.: 10/778,260

(22) Filed: Feb. 13, 2004

(65) Prior Publication Data

US 2005/0192919 A1    Sep. 1, 2005

(51) Int. Cl.
*G06F 17/30* (2006.01)

(52) U.S. Cl. .................................. 707/104.1
(58) Field of Classification Search ............ 707/1, 707/2, 9, 10, 201, 104.1; 709/224; 324/751
See application file for complete search history.

(56) References Cited

U.S. PATENT DOCUMENTS 5,787,442 A * 7/1998 Hacherl et al. ............. 707/201
6,744,266 B2 * 6/2004 Dor et al. .................... 324/751

* cited by examiner

*Primary Examiner*—Etienne P LeRoux
(74) *Attorney, Agent, or Firm*—Thomas, Kayden, Horstemeyer & Risley (57) ABSTRACT

A knowledge asset management system. An engineering data analysis system contains a plurality of objects. A first storage device stores records of users registered in the engineering data analysis system. A second storage device stores records of the operating history of the objects. A processor generates an object table specifying the characteristics of each object, determines the logical connection between the objects according to the operating history of the users and the characteristics of each object, and generates an object relational table accordingly. A knowledge asset database stores the object table and the object relational table containing records of a trigger object and corresponding linking objects.

9 Claims, 7 Drawing Sheets

| GEN_FUCTION_INFO | 31 |
|---|---|
| function_name | 310 |
| function_id | 311 |
| function_group | 312 |
| user_group | 313 |
| ana_data_level | 314 |
| target_group | 315 |
| target_data_level | 316 |
| function_desc | 317 |

FIG. 3B

| GEN_USER_INFO | 30 |
|---|---|
| user_name | 301 |
| major_function_group | 302 |
| major_data_group | 303 |
| user_group | 304 |
| user_level | 305 |
| function_access_cnt | 306 |
| monthly_avg_usabe | 307 |

| FUNCTION_NAME | ANA_DATA_LEVEL | TARGET_DATA_LEVEL |
|---|---|---|
| 4-in-1 weekly/lot yield trend & summary | PART | LOT |
| Bin summary by lot | LOT | WAFER |
| Graphic CP WaferMap | WAFER | DIE |

SYSTEM AND METHOD FOR KNOWLEDGE ASSET ACQUISITION AND MANAGEMENT

BACKGROUND

The invention described herein relates to the management of knowledge assets and more specifically to the acquisition, retention, and management of knowledge assets pertaining to utilization of an engineering data analysis system.

A typical semiconductor device goes through hundreds or thousands of processing steps during manufacture before it reaches its final form. During these steps, problems in processing issues may be encountered which require engineers or technologists to develop solutions. In the field of semiconductor manufacturing, Engineering Data Analysis (EDA) tools are frequently used for detecting and solving these processing issues. The number and complexity of the EDA tools increase rapidly corresponding to the progress in semiconductor manufacturing. As more EDA tools are created, it takes more time for users to become skillful in use thereof. Each user obtains knowledge assets using the EDA tools individually with no way to share important and helpful knowledge assets gained among users. Knowledge capital loss can occur when experienced users leave.

In the past, when engineers or technologists identified certain processing issues and problems, developed solutions thereto, the procedures and solutions employed and other pertinent information may not have been recorded or archived in such a way that the information is helpful to those without the same depth of knowledge in a particular area.

Hence, there is a need for a knowledge asset management system that addresses these problems.

SUMMARY

It is therefore an object of the invention to provide a system and method for knowledge asset acquisition and management, which provides help in utilization of EDA tools. To achieve this and other objects, the present invention provides a system and method capable of preserving and organizing knowledge assets acquired while using EDA tools for solving processing problems.

Another object of the present invention is to provide a system and method of organizing the knowledge assets in such a way that they are easily accessible.

According to one embodiment of the present invention, a knowledge asset management system, connected to an EDA system, is provided. The EDA system contains a plurality of objects, each of which is an EDA tool for processing engineering data.

The knowledge asset management system contains a first storage device, a second storage device, a processor, and a knowledge asset database. The first storage device stores records of users registered in the engineering data analysis system. The second storage device stores records of the operating history of the objects in the engineering data analysis system. The processor generates an object table specifying the characteristics of each object, selects a plurality of users from the user records in the first storage device according to a pre-defined criterion, determines the logical connection between the objects according to the operating history of the selected users and the characteristics of each object, and generates an object relational table accordingly. The knowledge asset database stores the analysis flow data, containing a plurality of object records targeting the corresponding object in the engineering data analysis system. The knowledge asset database stores the object relational table, which contains records for trigger objects and at least one corresponding linking object.

The present invention also provides a method of constructing the knowledge asset database described above. First, relevant information is provided, such as records of users registered in the engineering data analysis system, characteristics of the objects, and records of the operating history of the objects. Second, an object table is generated, containing characteristics of a plurality of objects. Then a logical connection between the objects is determined according to the operating history of the objects and the characteristics of each object.

The above-mentioned method may take the form of program code embodied in a tangible media. When the program code is loaded into and executed by a machine, the machine becomes an apparatus for practicing the invention.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION

The present invention will now be described with reference to FIGS. 1 to 6. In the present invention, a knowledge asset management system is coupled to an engineering data analysis system. While the preferred embodiment of the invention described hereafter operates with an engineering data analysis system implemented in a semiconductor fabrication environment, it is understood that the type of data processed by the engineering data analysis system is not critical to the present invention, and any engineering data analysis system having a plurality of engineering data analysis tools may operate with the present invention.

Figure 1:
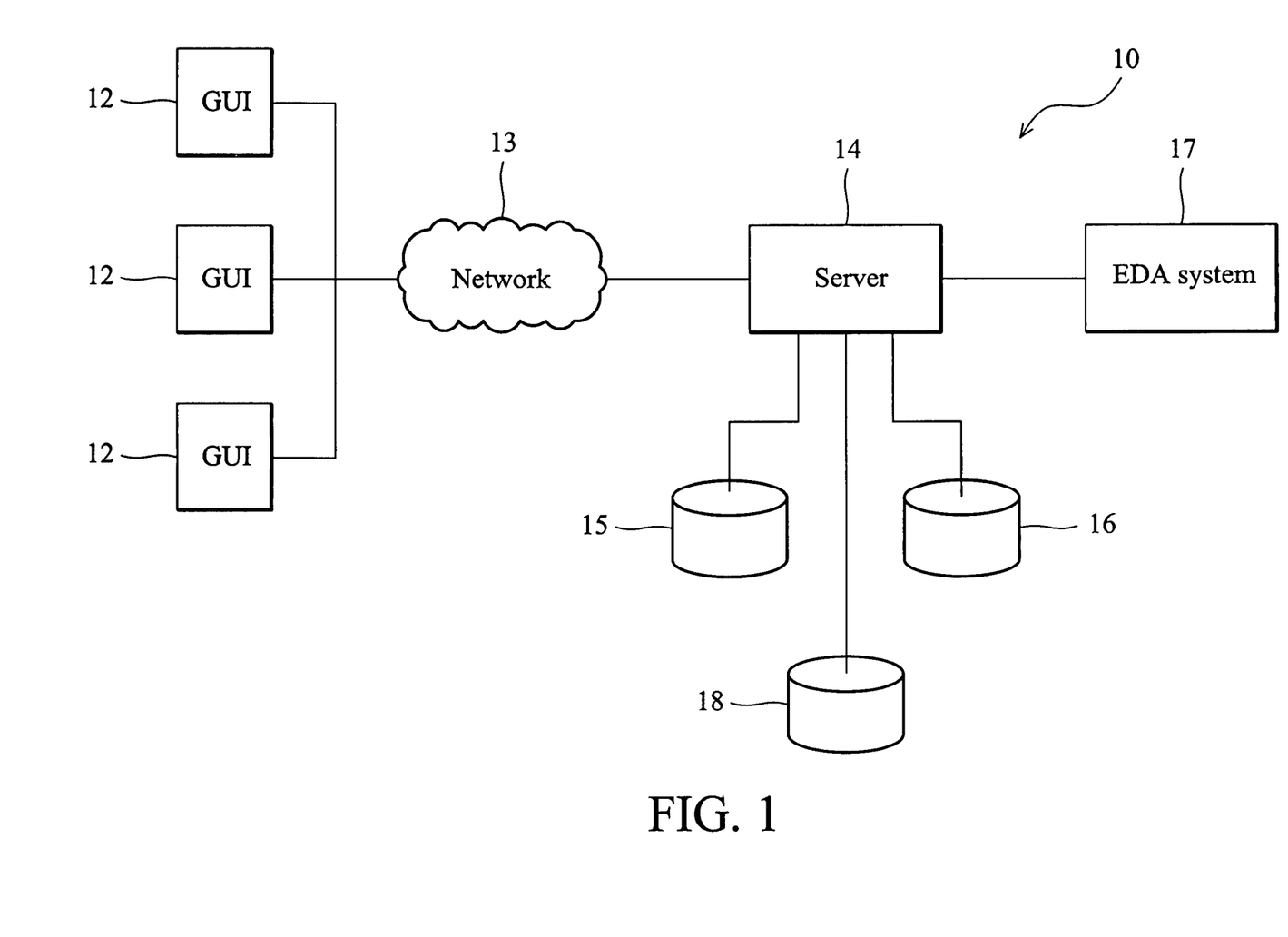
FIG. 1 is a schematic view of an embodiment of a knowledge asset management system according to the present invention.

FIG. 1 is a schematic view showing a knowledge asset management system according to the present invention. The knowledge asset management system 10 provides functionality for acquiring and preserving knowledge assets in a manner such that they are easily accessible. The system 10 may be accessed through a graphical user interface 12, in electrical connection with a network 13. The user interface 12 may be a personal computer with the capability to connect to a network. The network 13 may be a local area network (LAN) with a finite number of users or a data network such as the World Wide Web through which the system users may connect with a remotely located server 14. The server 14 is connected with three different memory devices and an engineering data analysis (EDA) system 17. The EDA system 17 contains a plurality of objects, each of which is an EDA tool for processing engineering data. Database 15 stores records of users registered in the engineering data analysis system 17. Database 16 stores records of the operating history of the objects. Server 14 generates an object table specifying the characteristics of each object, determines the logical connection between the objects according to the operating history of the users and the characteristics of each object, and generates an object relational table accordingly. Database 18 is a knowledge asset database storing the object table and the object relational table, which contains records for a trigger object and corresponding linking object. Server 14 also allows system users to utilize the knowledge assets stored in the object relational table when accessing the EDA system 17. The information stored in and retrieved from these databases is described in greater detail below. Any number of commercially available databases are suitable for use with the system 10. The objects in the EDA system 17 and the information stored in these storage devices can be accessed and viewed through the GUI 12.

Although the application shows a large scale information system in FIG. 1, which incorporates multiple user interfaces, a network, and a server and databases, one skilled in the art would realize that the system described herein may be implemented on a smaller scale. In particular, the present invention may be performed on a personal computer which has a hard drive with the capacity to store a significant amount of data and a processor and operating system which can run a number of executable programs.

Figure 2:
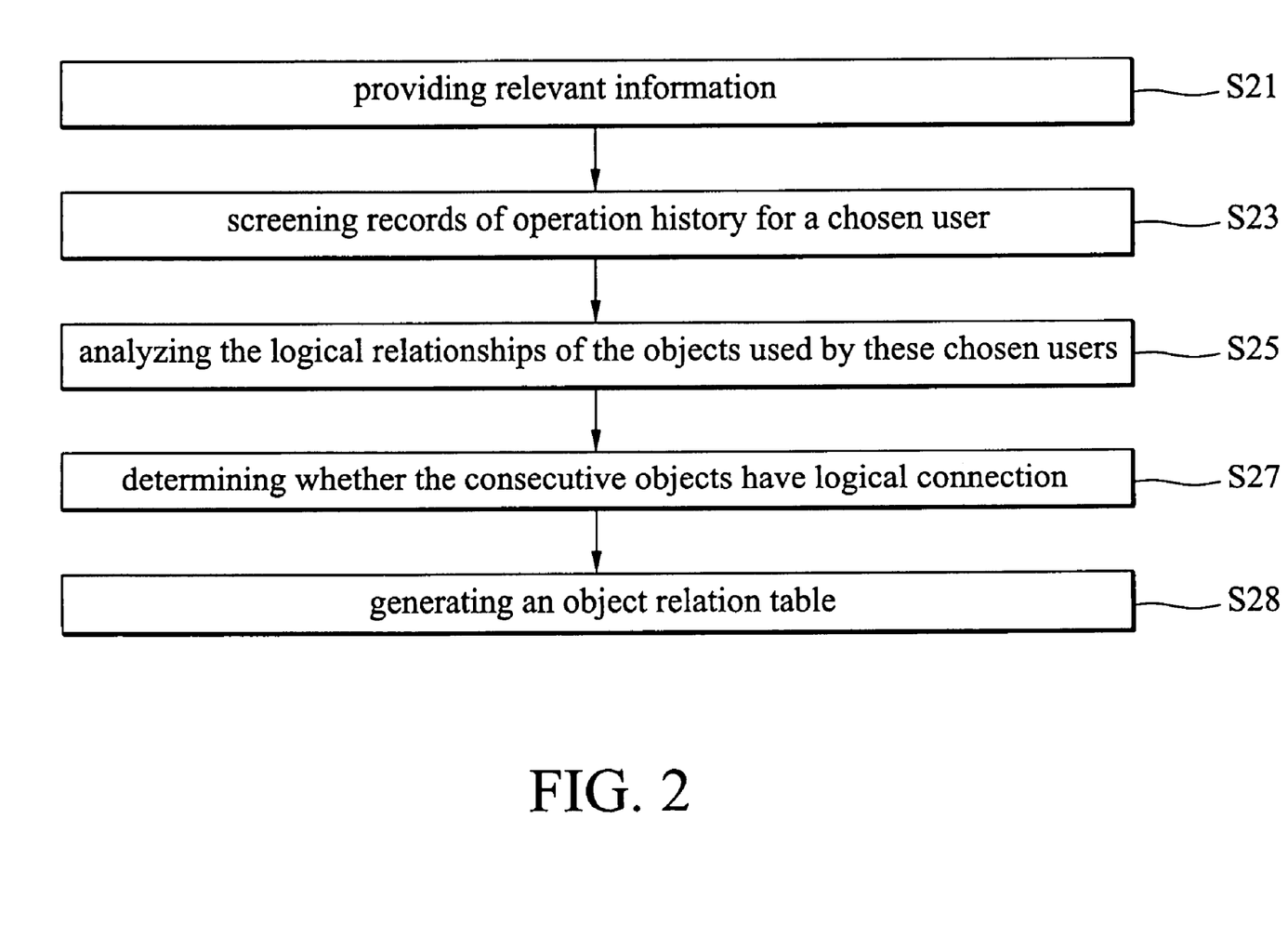
FIG. 2 is a flowchart showing a method for constructing the knowledge asset database in FIG. 1.
Figure 3A:
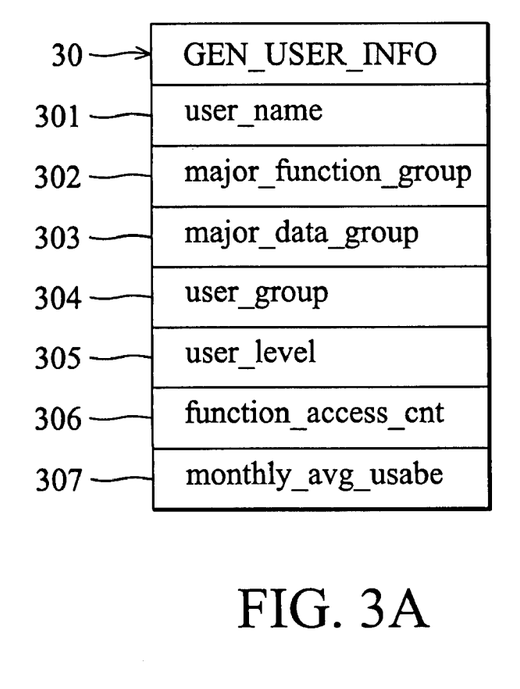
FIGS. 3A to 3C show the data structure according to the present invention.
Figure 3B:
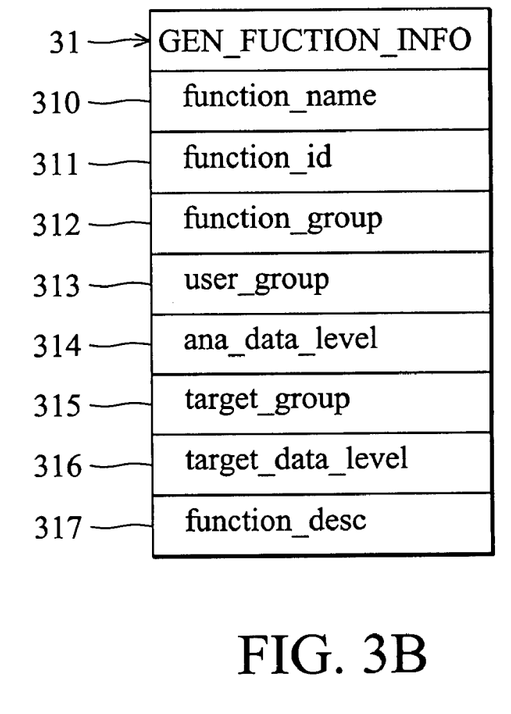
Figure 3C:
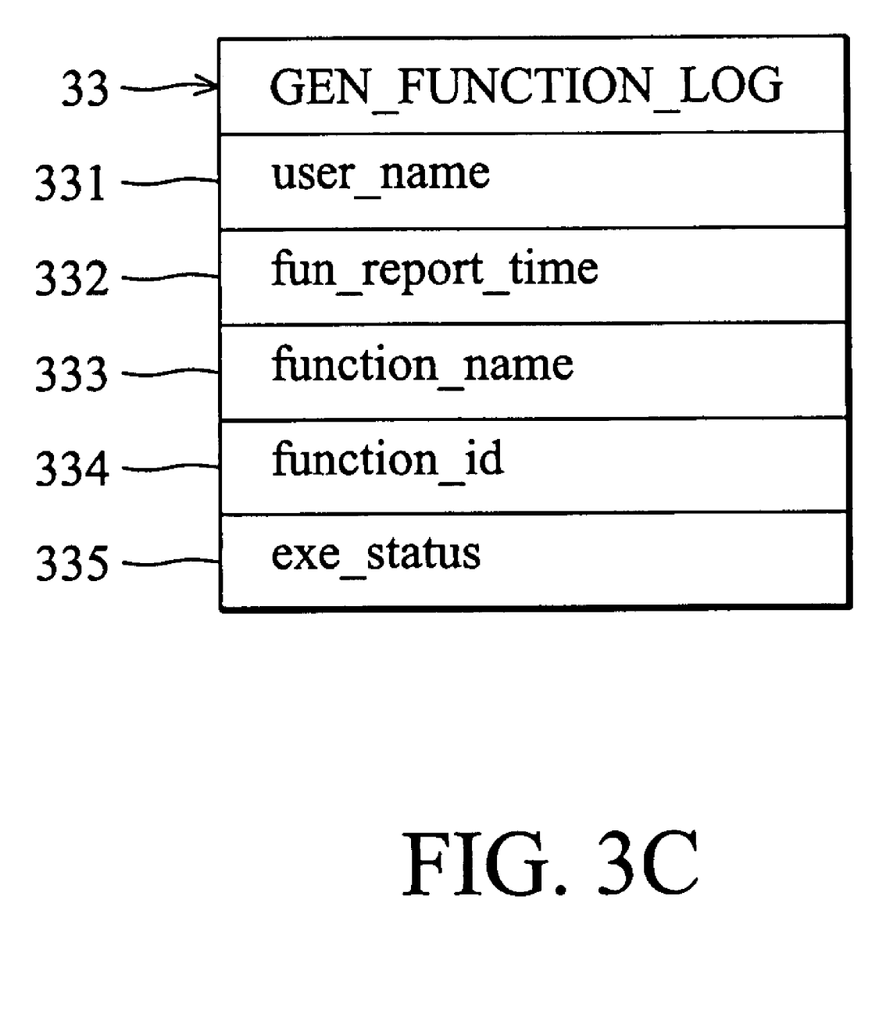

Disclosed in FIG. 2 is a flowchart which provides a general description of a method for constructing the knowledge asset database (shown in FIG. 1 as the database 18) describe above. First, relevant information is provided (step S21), such as records of users registered in the engineering data analysis system 17 and the operating history of the objects, and an object table specifying the characteristics of a plurality of objects is generated (step S22). The above-mentioned information can be stored in any format according to the particular needs of the user. According to this embodiment, the above-mentioned information is stored in the formats illustrated in FIGS. 3A to 3C. FIG. 3A shows a table 30, stored in database 15, for storing the record of a registered user of EDA system 17. The information contained in table 30 includes: user name (field 301), major function group to which the user belongs (field 302), major data group to which the user belongs (field 303), group identification of the user (field 304), professional level of the user (field 305), access count of a particular function of EDA system 17 for the user (field 306), and monthly average usage of a particular function of EDA system 17 for the user (field 307). FIG. 3B shows a table 31, stored in database 16, specifying the characteristics of one object in EDA system 17. The information contained in table 31 includes function name of the object (field 310), function identification of the object (field 311), function group to which the object belongs (field 312), group identification of the data processed by the object (field 313), level of the data processed by the object (field 314), group identification of the result data generated by the object (field 315), level of the result data generated by the object (field 316), description of the function of the object(field 317). FIG. 3C shows a table 33, stored in database 16, which contains one record entry of the operating history of one object in EDA system 17. The information contained in table 33 includes name of the user calling the object (field 331), function report time of the object (field 332), function name of the object (field 333), function identification of the object (field 334), executive status of the object (field 335).

Next, records of the operating history for a chosen user are screened out (step S23), wherein the user is selected according to a pre-defined criterion set according to user needs. According to this embodiment, the pre-determined criterion is a frequency criterion and/or a professional criterion. The frequency criterion is that the user utilizes the object at a frequency higher than a pre-determined value. Based on the frequency criterion, records of the operating history for users familiar with a particular EDA tool can be selected. The professional criterion is that the professional level of the user is higher than a pre-determined value. Based on the professional criterion, experience in using a particular EDA tool of an acknowledged expert can be extracted.

Figure 4:
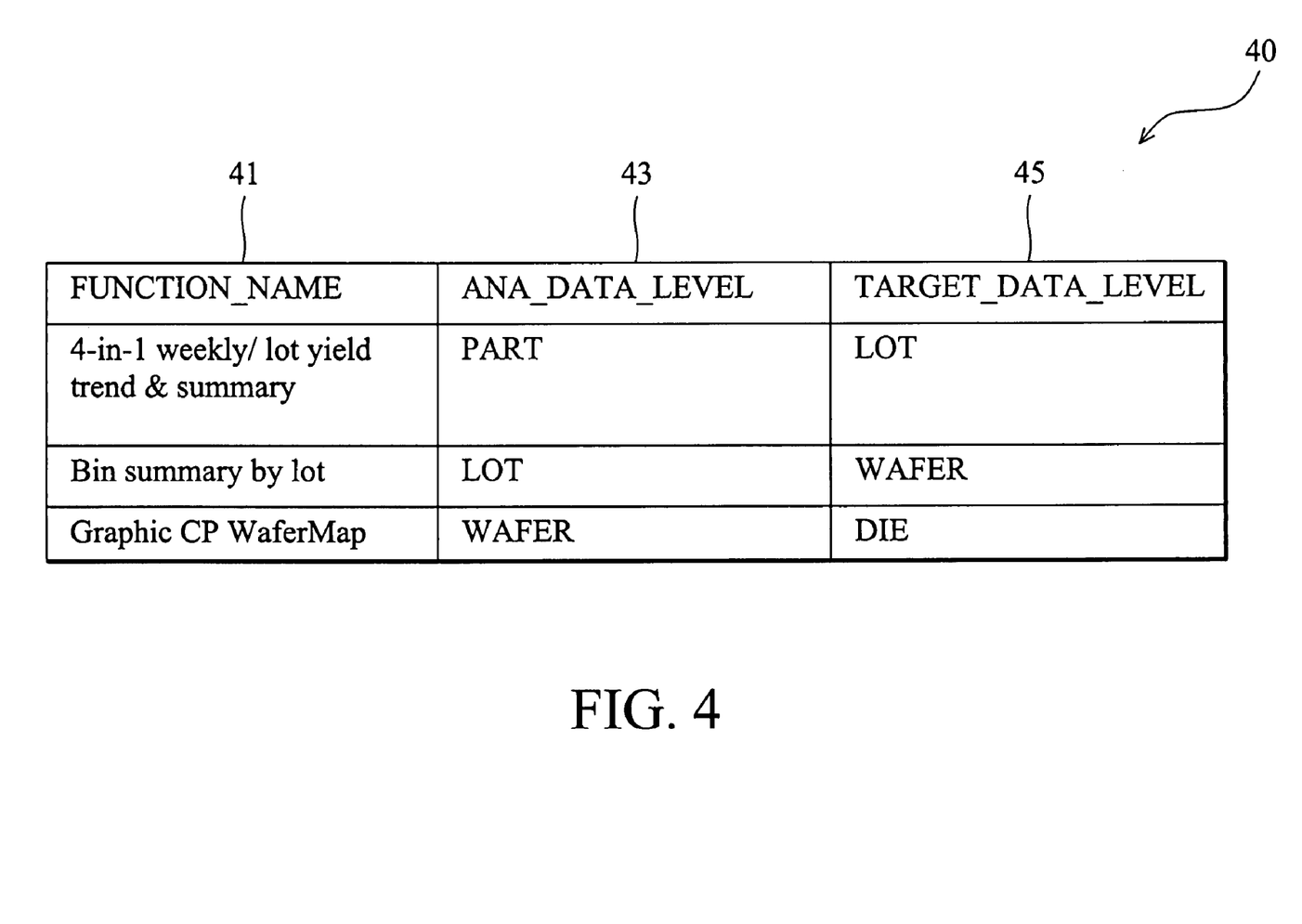
FIG. 4 illustrates data levels of the EDA tools according to the present invention.

After the operating history for a chosen user is screened, the logical relationships of the objects used by these chosen users are analyzed (step S25). As mentioned above, the objects in the EDA system are used for processing engineering data. Therefore, the logical relationship between these objects is strongly related to the operating sequence of the objects and the processed data thereof. According to this embodiment, the engineering data processed by these EDA tools is generated during wafer manufacture, such as measurement data collected from the wafer process, results of wafer acceptance testing, results of circuit probe testing, or equipment parameters. Each data entry is assigned a data level according to its content. Engineering data generated during the wafer manufacturing process can be assigned a data level such as die level, wafer level, lot level, or part level. Each EDA tool receives input data, processes it, and obtains result data. Therefore, each EDA tool is characterized by source and result data levels. Referring to FIG. 4, table 40 contains fields of function name of the EDA tool (field 41), data level of the corresponding source data (field 43), and result data (field 45) of the EDA tool. In step S25, the operating history for objects used in consecutive operations are screened from the objects selected in step S23. Not all objects used in consecutive operations have a logical connection therebetween. In step S27, whether the consecutive objects have logical connection is determined in accordance with the source and result data levels thereof. The consecutive objects have logical connection when the result data level of the leading object is higher than or equal to the source data level of the subsequent object. Using table 40 as an example, the EDA tool "4-in-1 weekly/lot yield trend & summary" has source and result data levels of "part" and "lot" respectively, and the EDA tool "bin summary by lot" has source and result data levels of "lot" and "wafer" respectively. If the above-mentioned objects are used in consecutive operations, and the EDA tool "4-in-1 weekly/lot yield trend & summary" is used earlier than the other, then they are considered as having logical connections therebetween for the result data level of the leading object equaling the source data level of the subsequent object.

Figure 5:
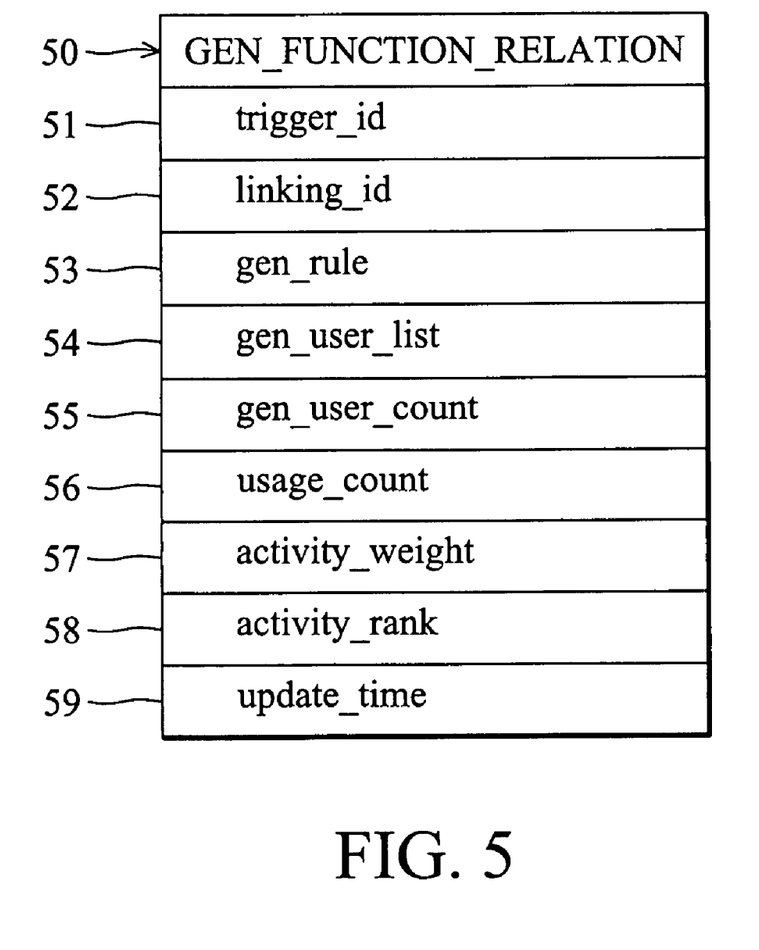
FIG. 5 shows the object relational table of the present invention.

Next, an object relational table is generated according to the logical connection between the objects (step S28). Each logical connection linkage corresponds to an object relational table. Referring to FIG. 5, object relational table 50 specifies the logical connection between two objects, wherein the leading object is referred to as a trigger object, and the subsequent object is referred to as a linking object. The information contained in object relational table 50 includes identification number of the trigger object (field 51), identification number of the linking object (field 52), and other related information, such as count of users of the logical connection and the update time of the logical connection.

The method of the present invention, or certain aspects or portions thereof, may take the form of program code (i.e. instructions) embodied in a tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 6:
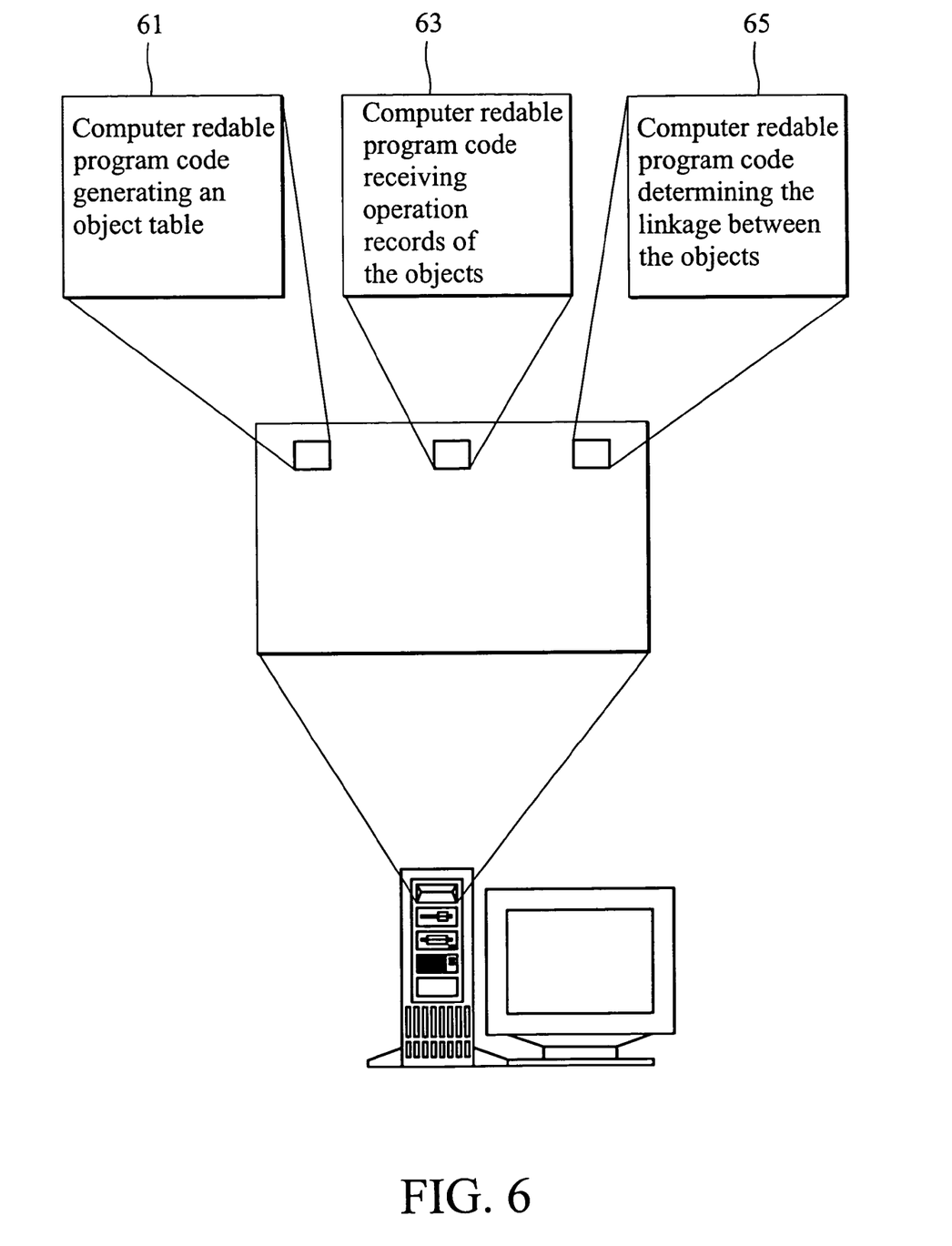
FIG. 6 is a diagram of a storage medium for storing a computer program providing the knowledge asset management method.

FIG. 6 is a diagram of a storage medium for storing a computer program providing the knowledge asset management method according to the present invention. The computer program product comprises a computer usable storage medium having computer readable program code embodied in the medium, the computer readable program code comprising computer readable program code 61 generating an object table comprising information of a plurality of objects, computer readable program code 63 receiving operating history of the objects, and computer readable program code 65 determining the logical connection between the objects according to the operating history, and generating an object relational table accordingly.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A knowledge asset management system for an engineering data analysis system having a plurality of objects, comprising:

a first storage device storing records of users registered in the engineering data analysis system;

a second storage device storing records of an operating history of the objects of the users;

a processor generating an object table specifying characteristics of each object, determining a logical connection between the objects according to the operating history of the users and the characteristics of each object, and generating an object relational table accordingly; and a knowledge asset database storing the object table and the object relational table, containing records of a trigger object and a corresponding linking object.

2. The knowledge asset management system of claim 1, wherein the object is used for data processing, and the processed data is engineering data produced during wafer manufacture, which is characterized by a data level according to the content thereof.

3. The knowledge asset management system of claim 2, wherein the processor further assigns each object a source data level and a result data level according to the data level of the data processed and produced by the processor respectively.

4. The knowledge asset management system of claim 2, wherein the processor further selects the operating history utilized in consecutive operations, and determines whether the consecutive objects have a logical connection according to the source and result data levels thereof.

5. The knowledge asset management system of claim 2, wherein the consecutive objects have a logical connection when the result data level of the leading object is higher than or equal to the source data level subsequent object.

6. The knowledge asset management system of claim 1, wherein the processor analyzes the operating history of selected users selected according to a pre-defined screening condition.

7. The knowledge asset management system of claim 6, wherein the pre-defined screening condition is use of the object at a frequency exceeding a pre-determined value.

8. The knowledge asset management system of claim 6, wherein the pre-defined screening condition is the professional level of the user exceeding a pre-determined value.

9. The knowledge asset management system of claim 1, wherein the processor further receives an object query and provides objects with logical connections according to the object relational table.

* * * * *